(No Model.)
F. MYERS.
TIRE REPAIRING TOOL.
No. 550,560.  Patented Nov. 26, 1895.
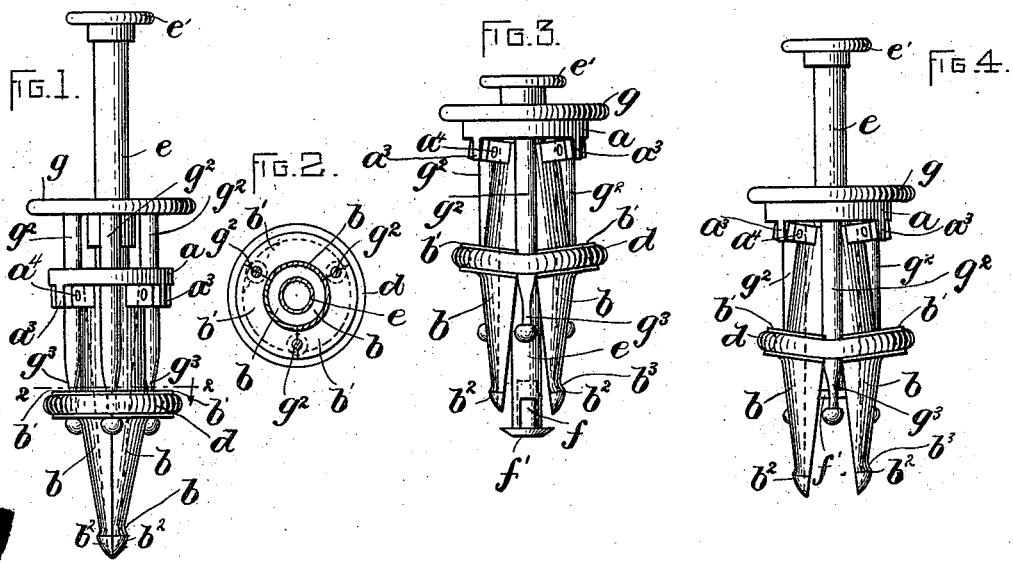
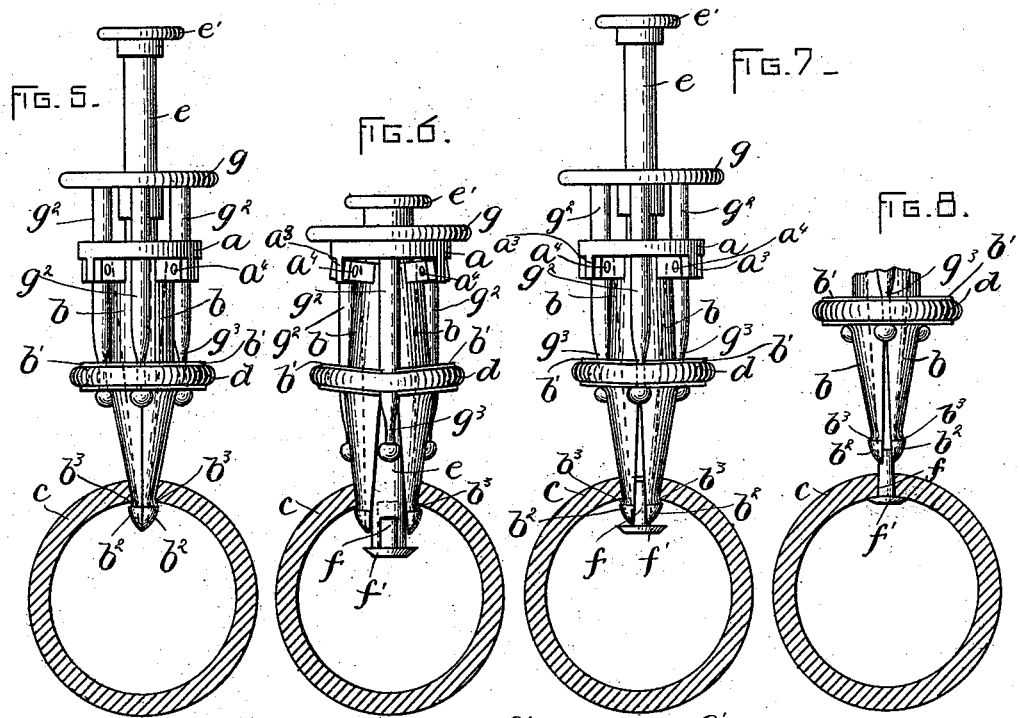
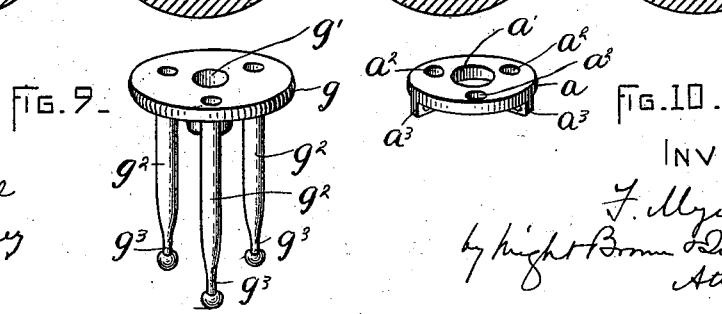
WITNESSES:
INVENTOR:
F. Myers
by Knight Brown & Quinby
Attys

UNITED STATES PATENT OFFICE.

FREDERICK MYERS, OF NEW YORK, N. Y., ASSIGNOR, BY DIRECT AND MESNE ASSIGNMENTS, OF ONE-FOURTH TO FREDERIC P. CLEMENT, OF RUTLAND, VERMONT, AND WILLIAM A. GRAY, OF WESTBOROUGH, MASSACHUSETTS.

TIRE-REPAIRING TOOL.

SPECIFICATION forming part of Letters Patent No. 550,560, dated November 26, 1895.

Application filed June 10, 1895. Serial No. 552,219. (No model.)

*To all whom it may concern:*

Be it known that I, FREDERICK MYERS, of New York, in the county of New York and State of New York, have invented certain new and useful Improvements in Tire-Repairing Tools, of which the following is a specification.

This invention relates to that class of tire-repairing tools comprising, first, an expansible tube or guide adapted to be inserted in a hole or puncture in a pneumatic tire for the purpose of temporarily enlarging said puncture; secondly, means whereby the tube may be expanded and contracted after its insertion in the puncture, and, thirdly, a plug-carrying plunger which is movable in the tube and is adapted to carry a headed plug through the temporarily-enlarged perforation or puncture in the tire and to leave the said plug in the puncture, the walls of the hole contracting sufficiently to engage the shank of the plug after the detachment of the tube, so that as the tube and plunger are withdrawn the contracting arms of the tube clutch the shank of the plug and draw the head of the same snugly against the inner wall of the tire, completely healing the puncture.

The invention has for its object to provide a simple and effective tool of this class; and to this end it consists in the improvements which I will now proceed to describe and claim.

Of the accompanying drawings, forming part of this specification, Figure 1 represents a side view of my improved tool, the tube being closed and the plunger retracted. Fig. 2 represents a section on line 2 2 of Fig. 1. Fig. 3 represents a side view showing the tube expanded and the plunger projected. Fig. 4 represents a side view showing the tube expanded and the plunger retracted. Figs. 5, 6, 7, and 8 represent side views showing different steps in the operation of the device. Figs. 9 and 10 represent perspective views of certain parts detached.

The same letters of reference indicate the same parts in all the figures.

In the drawings, $a$ represents a circular plate or head, which is provided with a central orifice or guide $a'$, Fig. 10, for the plunger hereinafter described and with a series of orifices or guides $a^2$ for the tapering or wedge-shaped tube-expanding pins hereinafter described. On the head $a$ are formed ears $a^3$, to which are pivotally connected at $a^4$ the sections $b\ b\ b$, which comprise the expansible penetrating tube or guide. Said sections are formed so that when closed together, as shown in Figs. 1, 2, and 5, they collectively form a tube, which is contracted at one end, the said sections being tapered at that end and formed to readily penetrate a perforation or puncture in a pneumatic tire $c$. The sections $b$ are provided with external projections $b'$, which collectively form a sectional disk surrounded by a contracting band or spring $d$, which may be an ordinary rubber band sprung into a groove in the external surfaces of said projections, said band serving to normally hold the sections together and thus contract the tube.

$e$ represents a plug-carrying plunger fitted to slide in the central guide $a'$ of the head $a$ and provided at its lower end with a socket to receive a headed plug, of rubber or other suitable material, said plug being designated by the reference-letter $f$.

$e'$ is a suitable handle or head at the outer end of the plunger $e$.

$g$ represents a collar having a central orifice $g'$, which surrounds the plunger $e$, the plunger having a free sliding movement in said collar.

To the collar $g$ are attached a series of downwardly-projecting pins $g^2$, the lower portions of which are tapered or wedge-shaped, as shown at $g^3$. Said pins pass through guides $a^2$ in the head $a$ and slide freely therein, their lower portions being interposed between the sectional projections $b'$ on the tube-sections $b$, as shown in Fig. 2.

When the collar $g$ is raised, as shown in Figs. 1 and 5, the tapered ends of the sections $b\ b\ b$ are drawn toward each other by reason of the fact that the smaller portions of the tapering pins $g^2$ are then interposed between the projections $b'$ on the tube-sections. A downward movement of the collar $g$ and its pins $g^2$ will cause the tapering portions of the said pins to separate the projections $b'$ and the tube-sections $b\ b\ b$, thus expanding the same, as shown in Figs. 3, 4, and 6.

By preference I provide near the lower end of the tube-sections $b\ b\ b$ enlargements $b^2\ b^2$, which form substantially, when the tapered ends of the sections $b\ b$ are contracted, an annular raised bead around the point of the instrument, the purpose of the said enlargements $b^2\ b^2$ being to afford a means to prevent the tool from slipping away from the walls of the puncture in the tire when the tube-sections $b\ b\ b$ are being expanded. Without some such provision for restraining the tool in connection with the tire great annoyance is experienced in the use of the article by reason of the fact that it will fall away from the tire the moment the operator removes pressure of his hand from the tool. It is apparent that the taper of the expanding jaws engaging the walls of the puncture will tend to separate the tool from the tire, and experiment proves that without any provision, such as the enlargements $b^2$, the expansion of the jaws immediately separates the tool from the tire unless the tool is kept pressed against the tire hard enough to prevent. Now it is apparent that if the operator is obliged to maintain a pressure of the tool against the tire he will be hampered in manipulation of the plug and its carrier. My invention, however, provides means for holding the tool effectually connected with the tire, so that the operator can leave hold of it entirely and have both hands free to manipulate the plug and carrier.

The operation is as follows: The plug $f$, which has an enlarged head $f'$, is first inserted into the socket of the plunger $e$, the plug being inserted shank first, as illustrated. The contracted end of the sectional tube is then inserted through the puncture in the tire. The lower ends of the tube-sections are then expanded and the plunger $e$ forced down, as shown in Fig. 6, thus inserting the plug $f$ within the tire. The collar $g$ and the pins $g^2$ are then raised sufficiently to permit the contraction of the tube-sections against the plunger. The plunger is then withdrawn and the ends of the tube-sections engage the shank of the plug $f$, as shown in Fig. 7, the ends of the tube-sections resting against the inner side of the plug-head $f'$, preventing the said plug from being withdrawn when the plunger $e$ is withdrawn. By withdrawing the instrument from the tire the inner surface of the plug $f$ may be drawn snugly into contact with the inner surface of the tire, the inner face of the plug-head $f'$ resting closely against the inner surface of the tire, while the surface of the shank portion of the plug is firmly engaged by the contracting walls of the perforation, as shown in Fig. 8. The tube-sections may then be expanded and the instrument entirely removed from contact with the plug. That portion of the shank of the plug which remains above the outer surface of the tire may be cut off, so as to afford a smooth outer surface.

The plug may be, and by preference is, coated with a suitable cement, so that it will adhere firmly to the tire and more completely heal and render air-tight the said puncture.

It will be seen that the above-described device is simple in construction and efficient in operation. The hinged or pivoted tube-sections, being closed by a spring which can readily be renewed, are not liable to lose their effectiveness and are easily kept in operative condition, it being an easy matter to remove a worn-out spring or tube-section and substitute others therefor. The construction is such that it is not necessary to separate the parts of the device, they being always assembled in operative relation to each other, so that there is no liability of their becoming mislaid. It is obvious, of course, that if desirable the plug-carrying plunger $e$ may be detachable from the rest of the instrument.

I claim—

1. A tire-repairing tool comprising a suitable head having a set of separable jaws together constituting a longitudinally divided tube, an expanding device on the exterior of said tube, and a plug-holding plunger longitudinally movable within the tube.

2. A tire-repairing tool comprising a suitable head having a set of separable jaws together constituting a longitudinally divided tube and formed with external projections, an expanding device engaged with said projections, and a plug-holding plunger within the tube.

3. A tire-repairing tool comprising a head having a central orifice, a series of separable jaws loosely attached to said head and constituting a longitudinally divided expansible tube or guide having a penetrating tapered end, said jaws being provided with external sectional projections, a contracting band or spring applied to said projections to normally contract the tube, and means for expanding said tube substantially as described.

4. A tire repairing-tool comprising a head having a central orifice, a series of separable jaws projecting downwardly from said head and constituting a longitudinally divided expansible tube or guide having a penetrating tapered end, said jaws being provided with external sectional projections, a contracting band or spring applied to said projections to normally contract the tube, and a plug holding plunger movable within said tube or guide, and means for expanding said tube.

5. A tire-repairing tool comprising a head having a central orifice and a series of guides, a series of separable jaws pivoted to the head and constituting a longitudinally divided expansible tube or guide having a penetrating tapered end, said jaws having external sectional projections, a contracting band applied to said projections to normally contract said tube or guide, a collar having a series of tapered or wedge shaped pins fitted to slide in the guides and interposed between the projections on the jaws, substantially as and for the purpose specified.

6. A tire-repairing tool comprising a suitable head having a set of separable jaws together forming an expansible tube, the said jaws tapering to bring the tube to a point and being formed with well defined enlargements back of the point to provide shoulders to bear against the inner side of the tire; means for expanding the tube; and means for inserting the plug, substantially as described.

In testimony whereof I have signed my name to this specification, in the presence of two subscribing witnesses, this 30th day of May, A. D. 1895.

FREDERICK MYERS.

Witnesses:
R. C. MITCHELL,
A. B. SMOOT.